(12) United States Patent
Ferrier et al.

(10) Patent No.: US 11,840,352 B2
(45) Date of Patent: Dec. 12, 2023

(54) NACELLE AIR INTAKE AND NACELLE COMPRISING SUCH AN AIR INTAKE

(71) Applicant: Safran Nacelles, Gonfreville l'Orcher (FR)

(72) Inventors: Gina Ferrier, Moissy Cramayel (FR); Patrick Boileau, Moissy Cramayel (FR); Pierre Caruel, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 260 days.

(21) Appl. No.: 17/510,643

(22) Filed: Oct. 26, 2021

(65) Prior Publication Data

US 2022/0041296 A1 Feb. 10, 2022

Related U.S. Application Data

(63) Continuation of application No. PCT/FR2020/050696, filed on Apr. 23, 2020.

(30) Foreign Application Priority Data

Apr. 26, 2019 (FR) ...................................... 19/04430

(51) Int. Cl.
*B64D 33/02* (2006.01)
*B64D 29/06* (2006.01)
*F02C 7/04* (2006.01)

(52) U.S. Cl.
CPC ............. *B64D 33/02* (2013.01); *B64D 29/06* (2013.01); *F02C 7/04* (2013.01);
(Continued)

(58) Field of Classification Search
CPC .................. B64D 33/02; B64D 29/06; B64D 2033/0206; B64D 2033/0273; B64D 2033/0286; F02C 7/04; F05D 2230/60
See application file for complete search history.

(56) References Cited

U.S. PATENT DOCUMENTS

2002/0179773 A1* 12/2002 Breer ..................... B64D 15/04
244/134 R
2008/0016844 A1* 1/2008 Shutrump ................. F02K 3/02
60/226.1
(Continued)

FOREIGN PATENT DOCUMENTS

EP 0913326 5/1999
FR 2856379 12/2004
(Continued)

OTHER PUBLICATIONS

International Search Report for International Application PCT/FR2020/050696, dated Sep. 11, 2020.
(Continued)

*Primary Examiner* — Justin M Benedik
(74) *Attorney, Agent, or Firm* — Burris Law, PLLC

(57) ABSTRACT

An air intake includes a substantially cylindrical inner wall, a substantially cylindrical outer wall, a front lip connecting the inner wall and the outer wall, a front mounting flange, and a support structure. The front mounting flange is configured to cooperate with a rear flange of a wall of an aircraft engine. The support structure is configured to be secured to the wall of the aircraft engine at a location longitudinally downstream of the mounting flange. The outer wall includes a downstream end configured to be positioned in a junction area flush with a front end of a fan external cowl. A portion of the outer wall being configured to bear at least against the support structure. The support structure is configured to be secured to the wall of the aircraft engine so that a load path passes directly from the outer wall towards the fan casing.

15 Claims, 5 Drawing Sheets

(52) U.S. Cl.
CPC ................ *B64D 2033/0206* (2013.01); *B64D 2033/0273* (2013.01); *B64D 2033/0286* (2013.01); *F05D 2230/60* (2013.01)

(56) References Cited

U.S. PATENT DOCUMENTS

2008/0078612 A1* 4/2008 Strunk .................... B64D 33/02
                                                                                      181/214
2019/0093557 A1* 3/2019 Thomas ................. B64D 33/02

FOREIGN PATENT DOCUMENTS

| | | |
|---|---|---|
| FR | 2966126 | 4/2012 |
| FR | 2998548 | 5/2014 |
| FR | 3016159 | 7/2015 |
| FR | 3055922 | 3/2018 |
| RU | 849694 | 9/1996 |
| RU | 2492117 | 9/2013 |

OTHER PUBLICATIONS

Search Report issued in corresponding RU Application 2021131441/11, dated Aug. 17, 2023, 2 pages.

\* cited by examiner

NACELLE AIR INTAKE AND NACELLE COMPRISING SUCH AN AIR INTAKE

CROSS-REFERENCE TO RELATED APPLICATIONS

This application is a continuation of International Application No. PCT/FR2020/050696, filed on Apr. 23, 2020, which claims priority to and the benefit of FR 19/04430 filed on Apr. 26, 2019. The disclosures of the above applications are incorporated herein by reference.

FIELD

The present disclosure relates to an aircraft propulsion unit comprising a nacelle and an engine such as a turbojet engine, and concerns in particular an air intake of such a nacelle.

BACKGROUND

The statements in this section merely provide background information related to the present disclosure and may not constitute prior art.

An aircraft is propelled by one or several turbojet engine(s) each housed within at least one nacelle. In general, the nacelle has a tubular structure comprising an air intake section upstream of the turbojet engine, a middle section configured to surround a fan of the turbojet engine, and a downstream section accommodating the thrust reversal means.

The downstream section of the nacelle surrounds the gas generator of the turbojet engine which terminates in an ejection nozzle located downstream of the turbojet engine.

In particular, the air intake section of the nacelle includes a front lip with an annular general shape which intercepts the intake air stream of the nacelle which is directed towards a fan.

For this purpose, the rest of the air intake structure has a substantially annular structure comprising an outer panel or wall providing the outer aerodynamic continuity of the nacelle and an inner panel or wall providing the inner aerodynamic continuity of the nacelle, in particular with the fan casing at the level of the middle section. The air intake lip provides the junction between these two walls forming a leading edge of the nacelle and could in particular be integrated to the outer panel thereby forming a main wall of the air intake.

In general, the front lip is constituted by one single annular-shaped part which is directly fastened on support partitions internal to the nacelle. Also, it should be noted the use of an upstream partition which forms an annular volume behind the "D"-like shaped front lip.

More specifically, the nacelle intake section generally includes an inner wall, preferably provided with a substantially cylindrical inner acoustic part having an upstream edge and a downstream edge, this part forming at least one portion of an acoustic shroud of the air intake being called "inner barrel;" a substantially cylindrical outer wall; a front lip connecting the inner and outer walls forming a leading edge; a downstream mounting flange configured for mounting of the intake section to a front flange of a wall of the turbojet engine; and a rear partition having a downstream end to secure the outer portion of the outer wall to the downstream mounting flange.

Moreover, the air intake generally comprises a deicing system. A known type of deicing or anti-icing system, disclosed in particular by the documents EP 0 913 326 B1 or U.S. Published Application No. 2002/0179773 A1, includes a circular tube surrounding the nacelle, which feeds in hot air sampled on the turbojet engine, the internal volume of the front lip of this nacelle in order to heat up its walls.

The extension of the front lip of the nacelle is desired in particular for aerodynamic reasons, in order to extend the laminar air flow area downstream. But its extension is not without impact on the design of the rest of the nacelle. In particular, the nacelle should have mechanical rigidity performances so as to reduce its deformations when subjected to the operating loads.

This results in the part that forms the front lip, which limits the fresh air intake of the nacelle, having a complex shape and large dimensions when viewed in section.

To address these issues, the concept of a so-called "extended" lip has been developed comprising an outer wall extending far downstream with respect to the inner wall and externally covering a portion of the fan casing, the outer wall as well as the lip forming an integral part, that is to say made in one-piece.

Such an arrangement described in the state of the art allows for savings in the material mass and in the complexity of the parts in comparison with the older state of the art wherein the outer envelope and the front lip of the intake section of the nacelle are constituted by separate parts.

However, while these arrangements are advantageous, additional annular reinforcements are disposed inside the outer envelope. Moreover, the unique part formed in this manner has a large dimension and a considerable volume and thus involves a complex and expensive tool for fabrication.

SUMMARY

This section provides a general summary of the disclosure and is not a comprehensive disclosure of its full scope or all of its features.

The present disclosure provides in particular a solution having the advantages in terms of aerodynamism of a so-called extended lip while providing improved rigidity.

The present disclosure provides an air intake for an aircraft engine nacelle. The air intake comprises a front lip connecting a substantially cylindrical inner wall and a substantially cylindrical outer wall, and a front mounting flange configured to cooperate with a rear flange of a wall of the turbojet engine. The outer wall comprising a downstream end configured to be positioned in a junction area flush with a front end of a fan external cowl. A portion of the outer wall being configured to bear at least against a support surface of a support structure configured to be secured to the wall of the turbojet engine forming a fan casing such that this securing is located longitudinally downstream of the mounting flange, in the assembled position.

With reference to the support structure, by "secured" or "securing," it should be understood that the support structure is configured to be secured to the wall of the turbojet engine forming the fan casing such that a load path, in the assembled position, passes from the outer wall to the fan casing, without passing through the inner wall.

According to one form, the support structure is directly fastened to the rear flange of the wall of the turbojet engine forming the fan casing. Such a solution has the aerodynamic advantages of a so-called extended lip, whose loads are transmitted directly from the air intake to the fan casing or engine casing, the path of the loads passing through the support structure. This improves the rigidity of the air intake, and of the nacelle in general in the assembled position of the air intake on the middle section of the nacelle.

By "downstream of the mounting flange, in the assembled position," it should also be understood as downstream of the upstream end of the flange, or downstream of a junction plane between the two flanges in the assembled position.

According to another form, the air intake lip may be integrated to the inner and/or outer wall.

According to yet another form, the air intake lip could be integrated to the inner and/or outer wall so as to form together a wall in one-piece. In other words, the air intake lip, the inner wall and the outer wall are formed in one-piece.

According to one form, the support structure is configured to be secured to the wall of the turbojet engine forming the fan casing such that a load path, in the assembled position, passes directly from the outer wall to the fan casing, without passing through the inner wall. In other words, the inner wall is avoided.

According to another form, the downstream end of the outer wall is configured to be located longitudinally in a range extending between an upstream end point, at a maximum distance of 70% of the length of the air intake upstream relative to the mounting flange; and a downstream end point, located at a maximum distance of 100% of the length of the wall of the turbojet engine forming the fan casing, downstream relative to the mounting flange.

According to yet another form, the air intake is configured such that, in the assembled position, the downstream end point is located at a distance less than 50% of the length of the wall of the turbojet engine forming the fan casing, downstream relative to the mounting flange, and more preferably at a distance less than 10 to 20% of the length of the wall of the turbojet engine forming the fan casing, downstream relative to the mounting flange.

According to one form, the downstream end of the outer wall is located longitudinally at, that is to say in line with, or upstream of the front mounting flange.

By "upstream of the front mounting flange," it should also be understood as upstream of the downstream end of the flange, that is upstream of the junction plane between the two flanges in the assembled position. Such a solution involves shifting upstream the connection between the downstream edge of the lip and the upstream edge of the external envelope. This against the preconceived idea of those skilled in the art that has led them to develop an extended lip for aerodynamic reasons. Moreover, such a feature combined with a fastening of the support structure downstream of the mounting flange on the internal envelope allows for a better transfer of loads.

In the case where the downstream end of the outer wall is located longitudinally upstream of the front mounting flange, this downstream end is located at a distance less than 50% of the length of the air intake upstream relative to the mounting flange, and in one form at a distance of between 10% to 20%, of the length of the air intake upstream relative to the mounting flange. Such a value represents a good tradeoff between aerodynamics, transfer of loads and ease of maintenance. Alternatively, in the case where the downstream end of the outer wall is located longitudinally downstream of the front mounting flange, this downstream end is configured so as to be located, in the assembled position, at a distance of less than 50% of the length of the wall of the turbojet engine forming the fan casing, downstream relative to the mounting flange, and in one form at a distance less than 10 to 20% of the length of the wall of the turbojet engine forming the fan casing, downstream relative to the mounting flange.

According to another form, the portion of the outer wall configured to come to bear at least against a support surface of the support structure comprises the downstream end of the outer wall. Advantageously, besides bearing against a support surface of the support structure, the outer wall is fastened thereto by fastening means.

According to yet another form, the downstream end of the outer wall is configured to support a front end of the fan external cowl in the junction area, in the assembled position. In such a configuration, the junction of the downstream end of the outer wall with the support structure is located under the bearing area of the fan external cowl on the outer wall of the air intake. In this case, the downstream end of the outer wall has a cutout sized as a function of the radial thickness of said fan external cowl such that the two walls successively forming the external aerodynamic line of the nacelle are continuous and flush. Because the junction is located under the bearing area of the fan external cowl, this makes it possible not to impact the quality of the lines and the cosmetic appearance (paint) by visible fasteners. As a result, the possible fastening means can be larger in sizes and fewer in number.

According to one form, the support of the front end of the fan external cowl is completed with fastening means for fastening the front end of the external cowl. Alternatively or complementarily, the fastening means can provide the direct fastening of the external cowl with the support structure.

According to another form, the support structure includes access apertures configured to be crossed by maintenance tools during operations of maintenance of the air intake.

According to yet another form, the support structure is disposed in a substantially continuous manner around the wall of the turbojet engine of the fan casing, and for example includes a partition. Alternatively or complementarily, the support structure is configured in a discontinuous manner around the wall of the turbojet engine of the fan casing, and includes for example a set of support rods which may form a lattice. In this case, a space between two rods may delimit an access aperture for maintenance.

According to one form, the lower end of the support structure is configured to be secured to a rear face of the rear flange. This contributes to improving the effort path and reinforcing the structure.

According to another form, the lower end of the support structure is directly fastened to the rear face of the rear flange.

According to yet another form, the present disclosure also concerns a nacelle comprising an air intake including all or part of the aforementioned features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 7A:
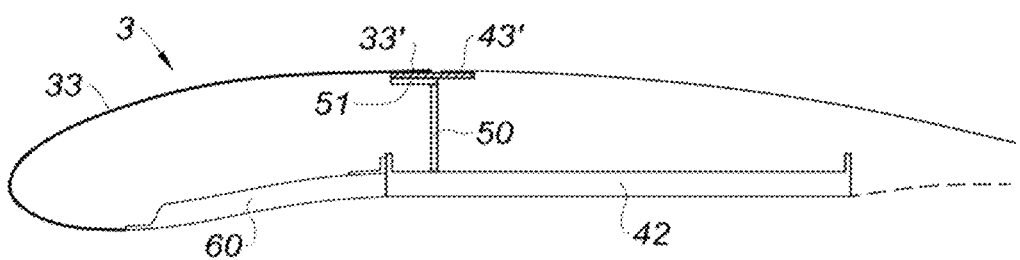
FIG. 7A is a partial longitudinal sectional view of an air intake showing one form of a support for an outer wall and a fan external cowl of the air intake according to the present disclosure.
Figure 7B:
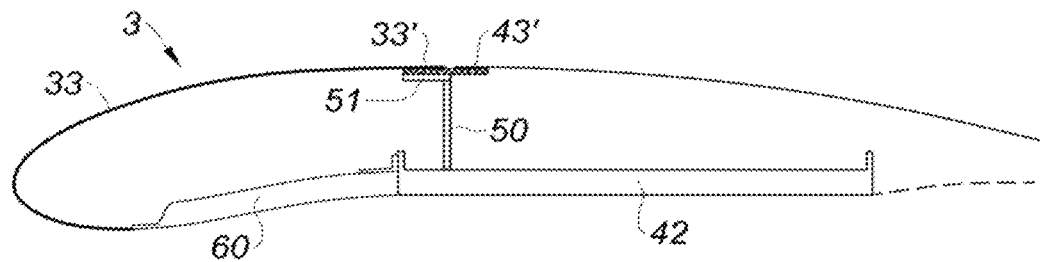
Figure 7C:
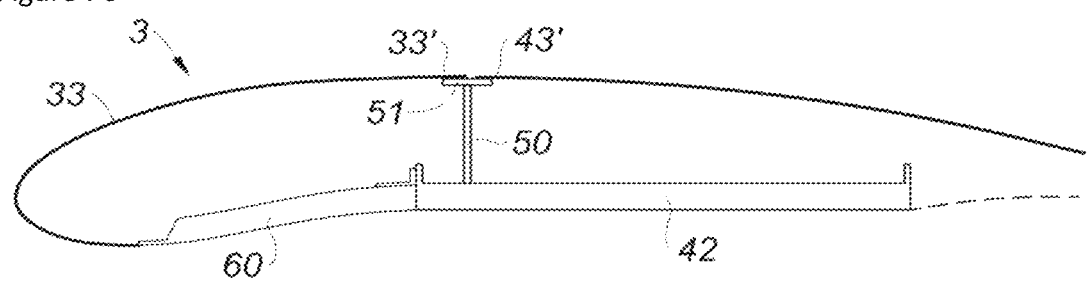

FIG. 7B is a partial longitudinal sectional view of an air intake showing another form of a support for an outer wall and a fan external cowl of the air intake according to the present disclosure; and FIG. 7C is a partial longitudinal sectional view of an air intake showing yet another form of a support for an outer wall and a fan external cowl of the air intake according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all these figures, identical or similar references refer to identical or similar members or sets of members.

The expression "upstream" and "front" will be used indiscriminately to refer to the upstream of the air intake and the expression "downstream" and "rear" will be used indiscriminately to refer to the downstream of the air intake.

Figure 1:
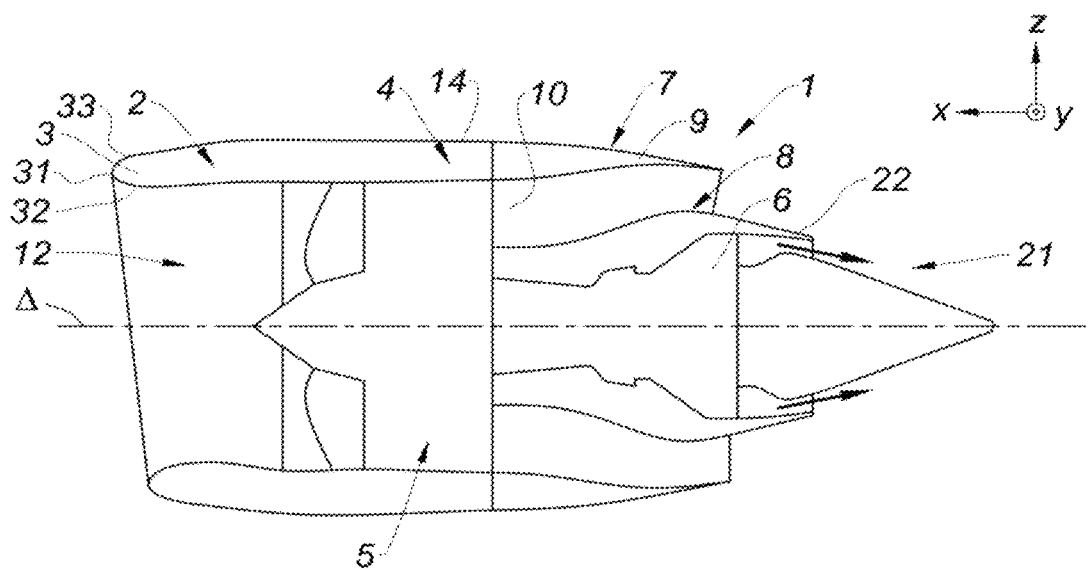
FIG. 1 is a cross-sectional view of a nacelle according to the principles of the present disclosure.

As represented in FIG. 1, a nacelle 1 according to the present disclosure has a substantially tubular shape according to a longitudinal axis Δ (direction parallel to X).

The nacelle 1 comprises an upstream section 2 with an air intake 3, a middle section 4 surrounding a fan 5 of an engine 6 such as a bypass turbojet engine and a downstream section 7 accommodating a thrust reverser system (not shown). The nacelle being configured to channel the air streams generated by the engine 6.

The air intake 3 is split into two portions, namely, on the one hand, an intake lip 31 adapted to allow the capture towards the turbojet engine of the air desired to feeding of the fan and of the inner compressors of the turbojet engine and, on the other hand, a downstream structure comprising substantially cylindrical inner and outer walls 32, 33 on which the lip 31 could be attached and configured to properly channel the air towards the blades of the fan. The set is attached upstream of a casing of the fan belonging to the middle section 4 of the nacelle 1.

In turn, the downstream section 7 comprises an inner structure 8 (also called "inner fixed structure" or "IFS") surrounding the upstream portion of the turbojet engine 6, an outer structure (also called "outer fan structure" or "OFS") 9 forming the cold stream channel and fixed with respect to the engine, and a movable cowl including thrust reversal means.

The IFS 8 and the OFS 9 delimit a flow path 10 allowing the passage of an air stream 12 penetrating the nacelle 1 at the level of the air intake 3.

The nacelle 1 includes a top 14 configured to receive a reactor attachment mast allowing fastening said nacelle 1 to a wing of the aircraft. For this purpose, said top 14 includes means for fastening said reactor mast.

In particular, the turbojet engine nacelle hangs to the reactor mast, through a beam at the level of this top 14.

The nacelle 1 terminates in an ejection nozzle 21.

Figure 2:
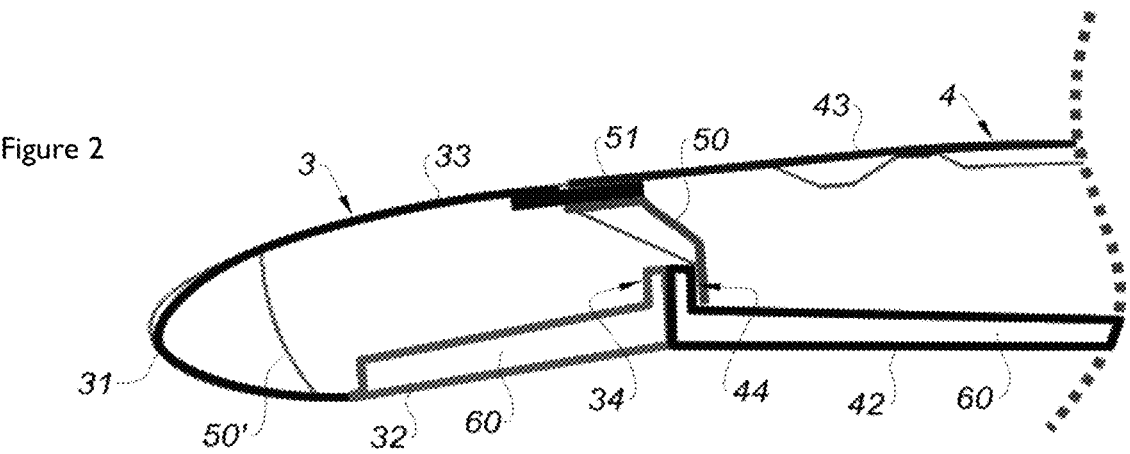
FIG. 2 is a partial longitudinal sectional view of an air intake of a nacelle.

As represented more specifically in FIG. 2, the air intake 3 includes a front lip 31 forming a leading edge of the nacelle. The lip 31 connects the substantially cylindrical inner wall 32 and the substantially cylindrical outer wall 33.

In other words, the air intake 3 has a substantially annular structure comprising the outer wall 33 providing the outer aerodynamic continuity of the nacelle 1 and the inner wall 32 providing the inner aerodynamic continuity of the nacelle 1, in particular with the fan casing at the level of the middle section 4.

The air intake lip 31 provides the junction between these two walls 32, 33 and could in particular be integrated to the inner and/or outer wall 32, 33 thereby forming a main wall of the air intake 3.

The internal envelope of the nacelle 1 includes an upstream portion (on the side of the air intake 3 of the nacelle 1) having in particular an acoustic shroud and a downstream portion (on the thrust reverser side) comprising the fan casing 42. Both upstream and downstream portions are connected by attachment flanges connected to the turbojet engine.

More specifically, the air intake 3 comprises at the level of its inner wall 32 a front mounting flange 34 configured to cooperate with a rear flange 44 secured to a wall of the turbojet engine, in particular of the casing 42 of the fan 5.

This assembly of the flanges 34 and 44 provides fastening of the air intake 3 with the middle section 4.

The outer wall 33 has a downstream end 33' configured to be positioned in a junction area flush with a front end 43' of a fan external cowl 43 so as to provide the outer aerodynamic continuity of the nacelle 1.

To maintain some rigidity to the structure, the outer wall 33 bears against a support surface 51 of a support structure 50. This bearing is completed with fasteners or fastening means to fasten the outer partition to said outer wall of the air intake 3.

The support structure 50 extends substantially radially across the thickness of the nacelle 1 and is configured to be secured to the fan casing 42 at a location longitudinally downstream of the flange 34.

In other words, the support structure comprises a lower end secured to the middle section 4 and an upper end forming a support surface of the outer wall 33 of the air intake 3.

The downstream end 33' of the outer wall 33 is further located longitudinally upstream of the front mounting flange 34. In such configuration, the support structure 50 has an orientation deviating forwards of the longitudinal axis of the nacelle 1.

In order to reduce the noise generated by the turbojet engine, at least the inner wall 32 of the air intake 3 is equipped with an acoustic attenuation structure 60, which is located in the space delimited by the main wall namely the inner wall 32, the outer wall 33 and the front lip 31.

The acoustic attenuation structure 60 is in the form of a panel with a cellular core forming a cellular structure whose pits delimit acoustic cells. The acoustic structure further comprises a solid inner skin providing in particular the mechanical strength of the panel.

In one form, the acoustic structure 60 is formed of composite materials. It should be understood that other materials could be used. These materials may be manufactured, for example, by thermoplastic molding, or additive manufacturing of aluminum.

The middle section 4 also includes such an acoustic structure equipping in particular at least partially the fan casing 42.

The mounting and rear flanges 34, 44 are secured to these respective acoustic structures 60.

Figure 3:
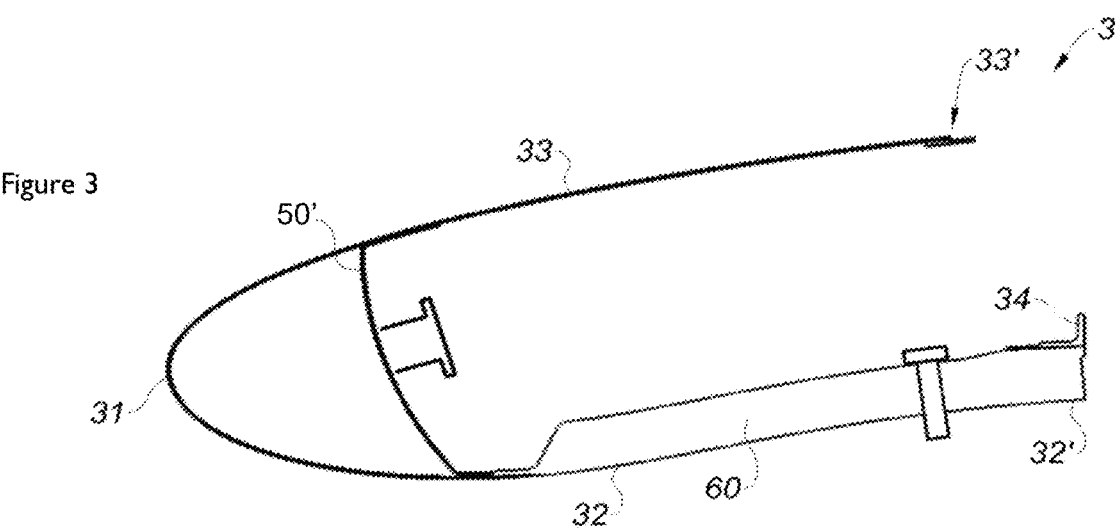
FIG. 3 is a partial longitudinal sectional views of an air intake of a nacelle according to one form of the present disclosure.
Figure 4:
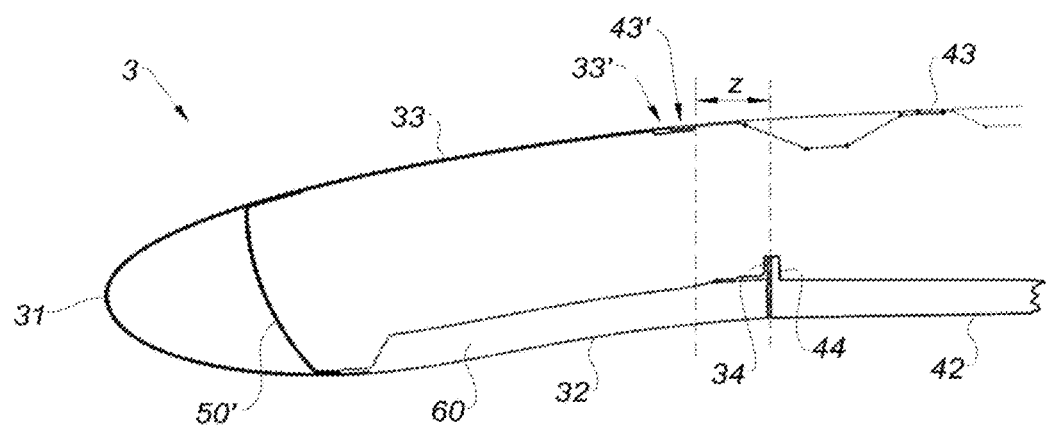
FIG. 4 is a partial longitudinal sectional views of an air intake of a nacelle according to another form of the present disclosure.

FIGS. 3 and 4 illustrate air intakes 3 according to forms herein without the support structure 50 to illustrate the offset of the downstream end 33' of the outer wall 33 longitudinally upstream of the front mounting flange 34.

FIG. 3 further illustrates equipment of the air inlet such as an electric power supply of a system for deicing the air inlet secured to the front support structure 50' and an engine probe passing through the acoustic attenuation structure 60 equipping the inner wall 32.

Figure 5A:
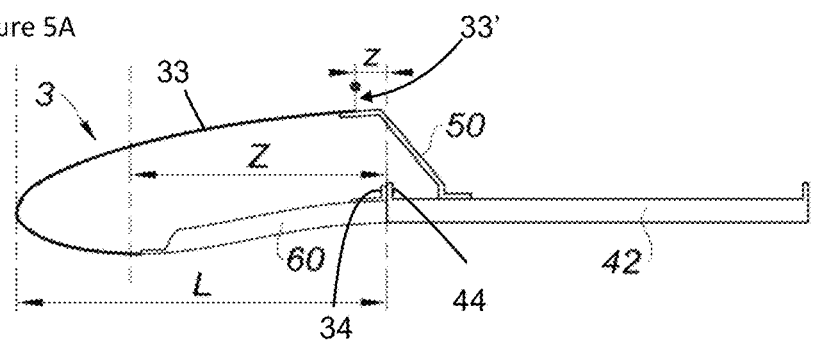
FIG. 5A is a partial longitudinal sectional view of an air intake with a downstream end of the outer wall located longitudinally upstream of the front mounting flange.
Figure 5B:
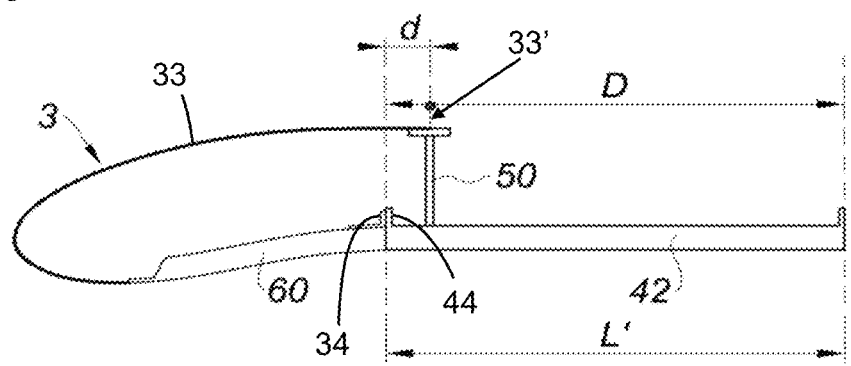
FIG. 5B is a partial longitudinal sectional view of an air intake with a downstream end of the outer wall located longitudinally downstream of the front mounting flange.

FIGS. 5A and 5B illustrate sectional views of an air intake 3 according to two forms. In FIG. 5a the air intake 3 comprises an outer wall 33 with a downstream end 33' located longitudinally upstream of the front mounting flange 34. In FIG. 5B, the air intake 3 comprises an outer wall 33 with a downstream end 33' located longitudinally downstream of the front mounting flange 34.

In the case where the downstream end 33' of the outer wall 33 is configured to be located longitudinally upstream relative to the front mounting flange 34, the downstream end 33' is positioned at a distance z from the front mounting flange 34 smaller than the maximum distance Z equal to 70% of the length L of the air intake 3 (measured between said flange 34 and the upstream end of the air intake 3).

In one form, the distance z is less than 50% of the length L. In another form, the distance z is between 10% and 20% of the length L.

In the case where the downstream end 33' of the outer wall 33 is configured to be located longitudinally downstream from the front mounting flange 34, the downstream end 33' is positioned at a distance d from the front mounting flange 34 which is less than the maximum distance D equal to 100% of the length L' of the wall of the turbojet engine forming the fan casing 42 (measured between said flange 34 and the downstream end of the fan casing).

In one form, the distance d is less than 50% of the length L'. In another form, the distanced is between 10% and 20% of the length L'.

Figure 6A:
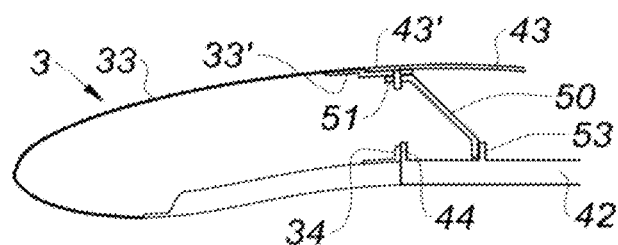
FIG. 6A is a partial longitudinal sectional view of an air intake.
Figure 6B:
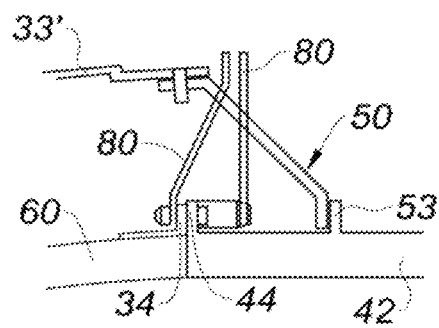
FIG. 6B is a cross-sectional view of a portion of the air intake of FIG. 6A.
Figure 6C:
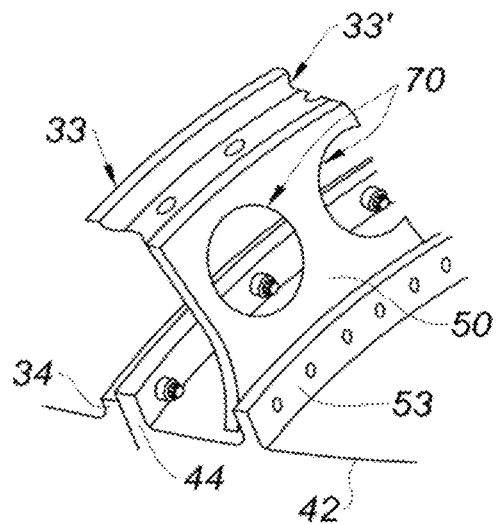
FIG. 6C is a perspective view of a portion of the air intake of FIG. 6A.

FIGS. 6A, 6B and 6C illustrate sectional views of an air intake 3. The air intake 3 comprises a support structure 50 provided with access apertures 70 (FIG. 6C) configured to be crossed by maintenance tools 80 (FIG. 6B) during operations of maintenance of the air intake 3.

These access apertures 70 are configured to be small enough to provide for the structural integrity of the nacelle 1 and large enough to be crossed by maintenance tools 80 during operations of maintenance of the air intake 3. It is then easier to access both the front mounting flange 34 and the rear flange 44, thus, facilitating maintenance operations. FIG. 6B illustrates configurations with access by tools 80 to the means for fastening the mounting flanges 34 and 44 together.

In this form, the support structure 50 is in the form of a partition, that is to say it is substantially continuous around the wall of the turbojet engine of the fan casing. The access apertures 70 are delimited by edges of the partition having a closed, substantially circular contour (FIG. 6C). An access aperture 70 may also be delimited partially by an element of the fan casing 42, for example, a fastening flange 53 separate from the flange 44 or directly to the fan casing 42.

In an alternative or complementary form (not illustrated herein), the support structure 50 may also be discontinuous around the wall of the turbojet engine of the fan casing, for example, formed totally or partially by a plurality of support rods or posts so as to form a lattice. The space formed between each of the support rods forms an access aperture 70. The access apertures 70 are for example delimited laterally by the two adjacent poles on the one hand and radially by the rear flange 44 and the outer wall 33. In this case, the support rods are distributed over the entire circumference of the nacelle 1 in a relatively homogeneous manner, in particular around the rear flange 44, and are spaced apart from each other by a predetermined distance sufficient to provide for the structural integrity of the air intake of the nacelle 1.

In the case where the support structure 50 comprises a partition, said partition may be segmented. In one form, the partition is solid, that is to say continuous, when it provides a fire door function.

As shown in FIG. 6A, the downstream end 33' of the outer wall 33 is configured to support a front end 43' of the fan external cowl 43 in the junction area, in the assembled position. The support may be completed with fasteners or fastening means for additionally fastening the fan external cowl 43.

The outer wall 33 bears against the support surface 51 of the support structure 50. The support is also completed with fastening means for fastening the support structure 50 to said outer wall 33. Moreover, the downstream end 33' of the outer wall 33 has a recess sized as a function of the radial thickness of said fan external cowl 43 such that the wall 33 and the cowl 43 successively form the external aerodynamic line of the nacelle 1, which is continuous and flush.

In such a configuration, the junction of the downstream end 33' of the outer wall 33 with the support structure 50 is located under the bearing area of the fan external cowl 43 on the outer wall 33 of the air intake 3.

This makes it possible not to impact the quality of the lines and the cosmetic aspect with visible fasteners. Therefore, the possible fastening means may be of larger sizes and fewer in number.

FIGS. 7A, 7B and 7C illustrate views of an air intake 3 according to three forms. Each form presents different variations of the support for the outer wall 33 and the fan external cowl 43 of the air intake 3.

Indeed, the support may be provided according to different configurations. For example, the respective ends 33', 43' of the outer wall 33 and the fan external cowl 43 may be adjoined and supported directly on the support surface 51 of the support structure 50 (FIG. 7C).

In another configuration, the respective ends 33', 43' of the outer wall 33 and the fan external cowl 43 rest on an intermediate part or are fastened by means of the intermediate part which rests on the support surface 51 of the support structure 50 (FIG. 7B).

According to another configuration, the intermediate part may be integrated into one of the external wall, for example the outer wall 33. In this case, as described with reference to FIG. 6A, the end 33' of the outer wall 33 has a cutout to support the end 43' of the fan external cowl 43 (FIG. 7A).

These configurations are illustrated here schematically, namely without additional fastening means. Of course, these junctions may be completed with fastening means.

For example, in the case of FIG. 7A, in addition to the support of the end 43' of the fan cowl on the end 33' of the outer wall 33, fasteners or fastening means may come to fasten the downstream end 33' of the outer wall 33 configured to support the front end of the fan external cowl, but also to be fastened with it by means of fastening means.

In the case where the support of the end 43' of the fan cowl is carried out directly on the support structure 50, this end may be additionally fastened by fastening means to provide its retention.

The present disclosure is described in the foregoing as an example. It goes without saying that those skilled in the art could carry out different variants of the present disclosure yet without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An air intake for an aircraft engine nacelle, the air intake comprising:
   a substantially cylindrical inner wall;
   a substantially cylindrical outer wall;
   a front lip connecting the substantially cylindrical inner wall and the substantially cylindrical outer wall;
   a front mounting flange configured to cooperate with a rear flange of a wall of the aircraft engine forming a fan casing; and
   a support structure configured to be secured to the wall of the aircraft engine at a location longitudinally downstream of the front mounting flange, in an assembled position,
   wherein the substantially cylindrical outer wall comprises a downstream end configured to be positioned in a junction area flush with a front end of a fan external cowl, a portion of the substantially cylindrical outer wall being configured to bear at least against a support surface of the support structure, and
   wherein the support structure is configured to be secured to the wall of the aircraft engine so that a load path, in the assembled position, passes directly from the substantially cylindrical outer wall towards the fan casing, while avoiding the substantially cylindrical inner wall.

2. The air intake according to claim 1, wherein the front lip is integrated to the substantially cylindrical inner wall and/or the substantially cylindrical outer wall so as to form a wall in one-piece.

3. The air intake according to claim 1, wherein the downstream end of the substantially cylindrical outer wall is located longitudinally at or upstream of the front mounting flange.

4. The air intake according to claim 3, wherein the downstream end of the substantially cylindrical outer wall is located longitudinally upstream of the front mounting flange, at a distance less than 50% of a length of the air intake upstream relative to the front mounting flange.

5. The air intake according to claim 4, wherein the downstream end of the outer wall is located longitudinally upstream of the front mounting flange at a distance between 10% and 20% of the length of the air intake upstream relative to the mounting flange.

6. The air intake according claim 1, wherein the downstream end of the outer wall is located longitudinally downstream of the front mounting flange, and is configured to be located, in the assembled position, at a distance less than 50% of a length of the wall of the aircraft engine downstream relative to the mounting flange.

7. The air intake according claim 6, wherein the downstream end of the substantially cylindrical outer wall is located longitudinally downstream of the front mounting flange at a distance less than 10% to 20% of the length of the wall of the aircraft engine downstream relative to the front mounting flange.

8. The air intake according to claim 1, wherein the portion of the substantially cylindrical outer wall configured to bear at least against the support surface of the support structure comprises the downstream end of the substantially cylindrical outer wall.

9. The air intake according to claim 1, wherein the substantially cylindrical outer wall is fastened to the support surface of the support structure by fasteners.

10. The air intake according to claim 1, wherein the downstream end of the substantially cylindrical outer wall is configured to support the front end of the fan external cowl in the junction area, in the assembled position, via fasteners.

11. The air intake according to claim 1, wherein the support structure includes access apertures configured to be crossed by maintenance tools during operations of maintenance of the air intake.

12. The air intake according to claim 1, wherein the support structure is disposed continuously around the wall of the aircraft engine of the fan casing and comprises a partition.

13. The air intake according to claim 1, wherein the support structure is disposed discontinuously around the wall of the aircraft engine of the fan casing and comprises a set of support rods.

14. The air intake according to claim 1, wherein the support structure configured to be secured to the wall of the aircraft engine comprises a lower end of the support structure configured to be secured to a rear face of the rear flange of the wall of the aircraft engine.

15. A nacelle for an aircraft engine comprising an air intake according to claim 1.

* * * * *